(12) United States Patent
Hupfer

(10) Patent No.: US 6,866,319 B2
(45) Date of Patent: Mar. 15, 2005

(54) DEPOSITING COMPARTMENT IN A VEHICLE

(75) Inventor: Christian Hupfer, Rheinstetten (DE)

(73) Assignee: Dr. Ing h.c.F. Porsche AG, Weissach (DE)

( * ) Notice: Subject to any disclaimer, the term of this patent is extended or adjusted under 35 U.S.C. 154(b) by 105 days.

(21) Appl. No.: 10/218,093

(22) Filed: Aug. 14, 2002

(65) Prior Publication Data

US 2003/0057709 A1 Mar. 27, 2003

(30) Foreign Application Priority Data

Aug. 14, 2001 (DE) .......................................... 101 39 867

(51) Int. Cl.⁷ ................................................. B60R 7/04
(52) U.S. Cl. ...................... 296/37.8; 224/282; 224/542; 224/544
(58) Field of Search ............................... 296/37.1, 37.7, 296/37.8, 37.14; 209/926; 224/403, 483, 279, 282, 539, 542, 544; 297/188.19, 188.13; 312/324

(56) References Cited

U.S. PATENT DOCUMENTS 4,423,812 A * 1/1984 Sato .......................... 296/37.8
5,863,089 A * 1/1999 Ignarra et al. ............. 296/37.8

FOREIGN PATENT DOCUMENTS

| DE | 4309620 | 9/1994 |
| DE | 10000284 | 7/2001 |
| EP | 0587014 A2 * | 9/1992 |

* cited by examiner

Primary Examiner—Jason Morrow
(74) Attorney, Agent, or Firm—Crowell & Moring LLP

(57) ABSTRACT

A depositing compartment in a vehicle, having a lid covering a depositing opening and having a depositing bowl arranged in the depositing compartment which is accessible by swivelling open the lid. One releasable lock respectively is arranged at least between the depositing bowl and the lid as well as between the depositing compartment and the depositing bowl. The locks are optionally unlockable by way of a joint unlocking device. An operating-friendly lock arrangement which has a simple construction is created in that the unlocking device for the two locks comprises a spring-loaded double-side push button key which interacts with an axially slidable lock bolt by way of an upright adjusting arm, depending on the pressure exercised on the push button key, one lock or the other lock being unlocked.

23 Claims, 2 Drawing Sheets

DEPOSITING COMPARTMENT IN A VEHICLE

BACKGROUND AND SUMMARY OF THE INVENTION

This application claims the priority of German Appln. No. 101 39 867.0, filed Aug. 14, 2001, the disclosure of which is expressly incorporated by reference herein.

The invention relates to a depositing compartment in a vehicle, having a swivellably linked lid covering a depositing opening and having a depositing bowl arranged in the depositing compartment which is accessible by swivelling open the lid, one releasable lock respectively being arranged at least between the depositing bowl and the lid as well as between the depositing compartment and the depositing bowl, and the locks being optionally unlockable by way of a joint unlocking device.

In the case of a known arrangement of the initially mentioned type (German Patent Document DE 43 09 620 A1), the locking arrangement for the two-part depositing compartment comprises a lock between the depositing bowl and the lid, another lock between the depositing bowl and the depositing compartment, and an additional lock between the lid and the depositing compartment. All locks can be unlocked by means of a joint unlocking device which has a single handle or two handles situated side-by-side. This arrangement has the disadvantage that the three locks, which act together, and the unlocking device have a high-expenditure cost-intensive construction so that faulty conditions may occur.

It is an object of the invention to further develop a locking arrangement for a two-part depositing compartment in a vehicle having an unlocking system such that, on the one hand, the construction is significantly simplified and, in addition, the operating friendliness is increased.

According to the invention, this object is achieved by providing a depositing compartment assembly in a vehicle, comprising a swivellably linked lid covering a depositing opening, a depositing bowl arranged in a depositing compartment which is accessible by swivelling open the lid, and one releasable lock respectively being arranged at least between the depositing bowl and the lid as well as between the depositing compartment and the depositing bowl, said locks being optionally unlockable by way of a joint unlocking device, wherein the unlocking device for the two releasable locks comprises a spring-loaded double-side push button key which interacts with an axially slidable lock bolt by way of an upright adjusting arm, and wherein depending on pressure exercised on the push button key, one lock or the other lock is unlocked. Additional characteristics advantageously developing the invention are described herein and in the claims.

Principal characteristics achieved by means of the invention are that, as a result of the construction of the two locks and of the unlocking device according to the invention, a simple cost-effective construction is created which is also very operating-friendly. Only locks are required which each comprise few components, the locks being coupled in a simple manner with the unlocking device. The arrangement according to the invention requires very little space and permits a completely closed, flush design surface in the area of the two-part depositing compartment.

In the following, an embodiment of the invention will be explained in detail by means of the drawing.

Other objects, advantages and novel features of the present invention will become apparent from the following detailed description of the invention when considered in conjunction with the accompanying drawings.

DETAILED DESCRIPTION OF THE DRAWINGS

Figure 1:
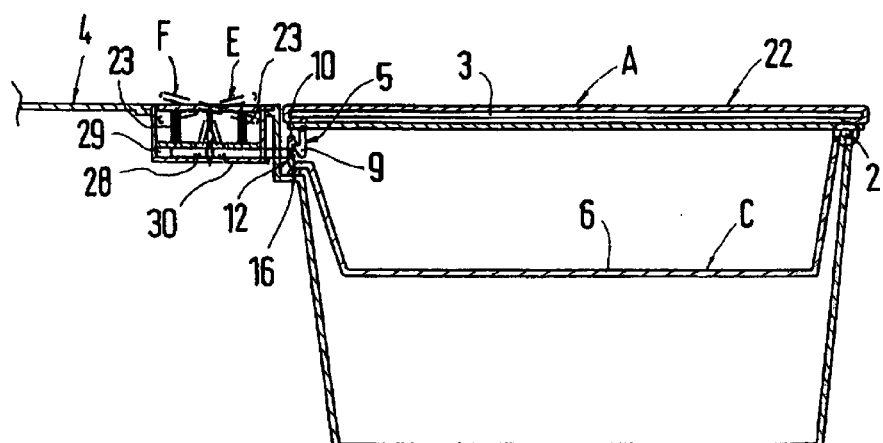
FIG. 1 is a vertical longitudinal sectional view of a two-part depositing compartment in a vehicle shown when the lid is closed with a double lock and an unlocking device constructed according to a preferred embodiment of the invention.

FIG. 1 illustrates a depositing compartment 1 arranged between two vehicle seats in a vehicle, which is not shown. The depositing compartment is closed in the upward direction by a lid 3 which covers the depositing compartment opening and is swivellably linked in a hinge axis 2 to the depositing compartment 1. The depositing compartment 1 is arranged on a stationary center console, a swivellable center arm rest, a glove compartment or the like. In the embodiment shown, the depositing compartment 1 is constructed in one piece with a stationary center console 4.

Figure 2:
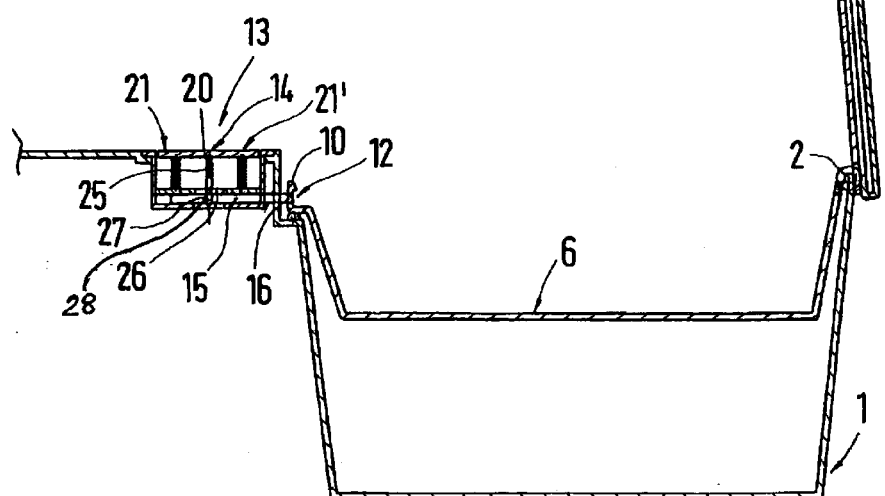
FIG. 2 is a longitudinal sectional view according to FIG. 1, with the lid in a swivelled-up position.
Figure 3:
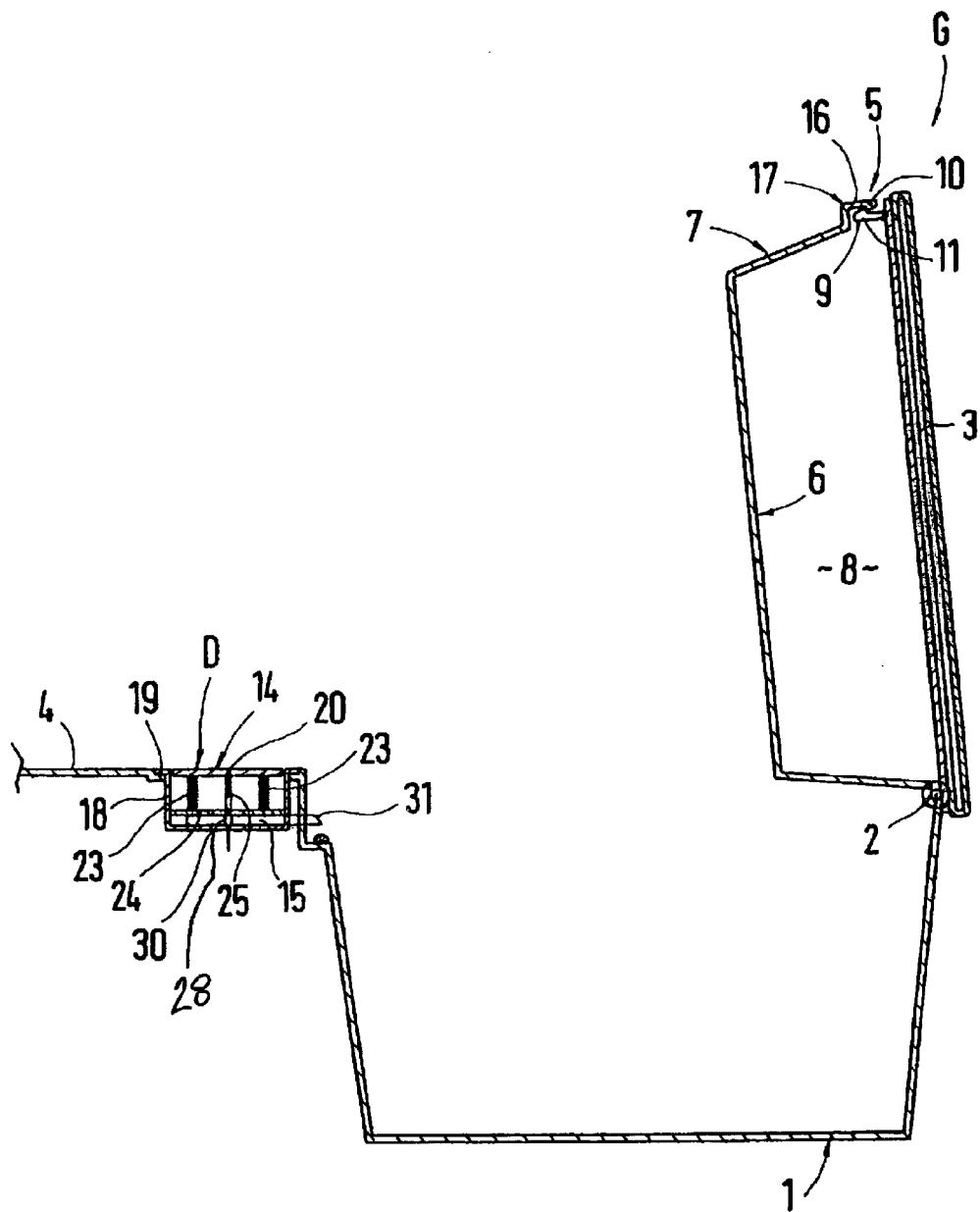
FIG. 3 is a longitudinal sectional view according to FIG. 1, with the lid and the depositing bowl in a swivelled-up position.

The approximately horizontally aligned, transversely extending hinge axis 2 is situated at the rear upper edge of the center console 4. The lid 3, which is approximately horizontally aligned in the closed position A, after the release of a first locking device 5, can be swivelled upward to the rear into a swivelled-up position B (FIG. 2). Furthermore, a depositing bowl 6 is arranged in the upper area of the depositing compartment 1 and is also accessible by the swivelling-open of the lid 3 but can also be swivelled upward (FIG. 3) forming a unit 7 with the lid 3. For this purpose, the depositing bowl 6 is linked also in the hinge axis 2 to the depositing compartment 1 and is covered by the lid 3 in such a manner that, together with the hollow space 8 of the trough-shaped depositing bowl 6, this lid forms a closed receiving space, for example, for a telephone receiver, for a cell phone, or the like.

The first lock 5 is provided between the lid 3 and the depositing bowl 6 and comprises a spring-loaded swivellable detent pawl 9 which is arranged on the lid 3 and, in the closed position A of the lid 3, reaches behind a stationary detent 10 of the depositing bowl 6. The downward projecting detent pawl 9 is arranged on the side of the lid 3 situated opposite the hinge axis 2, the upper end of the detent pawl 9 being rotatably linked to the lid 3. At the lower end, the detent pawl 9 has a nose-shaped molded-on section 11, which reaches under the detent 10 of the depositing bowl 6. In addition, a second lock 12 is arranged which is operative between the depositing compartment 1 and the depositing bowl (FIG. 2).

A joint unlocking device 13 is disposed in front of the two locks 5, 12, which unlocking device 13 is composed of a spring-loaded, double-side push button key 14 and a longitudinally displaceable lock bolt 15, depending on the admission of pressure to the push button key 14, the first lock 5 or the second lock 12 being unlocked. The second lock 12 is formed by the lock bolt 15 which, in the closed position C of the depositing bowl 6, projects at least in areas into a recess 16 of the depositing bowl 6 or penetrates through this recess 16. The recess 16 is provided on an end-side upright wall section 17 of the depositing bowl 6, specifically, directly below the rearward-directed detent 10. Viewed in its cross-section, the recess 16 has a slightly larger construction than the cross-section of the lock bolt 15, in which case, the cross-sectional shapes of the lock bolt 15 and of the recess 16 are adapted to one another.

The lock bolt 15 preferably is a rectangular or square cross-sectional shape. The double-sided push button key 14 and the oblong lock bolt 15 are assigned to a housing 18 which, in the embodiment shown, is inserted from the top into a receiving opening 19 of the center console 4. The receiving opening 19 extends adjacent to the depositing compartment 1. The double-sided push button key 14 is swivellably disposed about the axis of rotation 20 approximately in the center at the upper edge of the housing 18. In the inoperative position D of the push button key 14, both switching surfaces 21, 21' of the push button key 14 extend approximately flush with the surface of the adjacent outer lid contour 22, one upright-arranged spring element 23 respectively being assigned to the two switching surfaces 21, 21' of the push button key 14. Each spring element 23 is formed by a pressure spring which extends between the interior side of the switching surface 21, 21' and the wall 24 of the housing 18 situated underneath.

In addition, in the area of its center axis of rotation 20, the push button key 14 has a downwardly directed adjusting arm 25 which projects through an opening 26 of the wall 24 and projects with its free end 27 into a recess 28 of the lock bolt 15 which is open at least in the upward direction. The recess 28 at the lock bolt 15 expands in the front and in the rear in each case downward to the outside. The oblong lock bolt 15 extends in a housing-side receiving device 29 which is bounded in the vertical direction by the wall 24 and the lower boundary wall 30. Lateral guides at the housing 18 for the lock bolt 15 are not shown in detail in the figures. In the inoperative position D of the push button key 14, the upright adjusting arm 25 extends approximately vertically; the switching surfaces 21, 21' are aligned flush with the surface of the outer contour 22 of the lid; and the lock bolt 15 projects through the recess 16 of the depositing bowl 6. At its free end, the lock bolt 15 has a slope 31 which extends parallel and at a slight distance with respect to the slant of the nose-shaped molded-on section 11.

When the forward push button key 14, that is, of the forward switching surface 21, is operated in the downward direction (position E), the adjusting arm 25 of the push button key 14 is swivelled by a slight angle counterclockwise, whereby the lock bolt 15 is simultaneously displaced toward the rear. As a result, the end-side slope 31 of the lock bolt 15 comes in contact with the spring-loaded detent pawl 9 and swivels the latter toward the rear (counterclockwise), so that the detent pawl 9 disengages from the stationary detent 10 of the depositing bowl 6. The first lock 5 between the depositing bowl 6 and the lid 3 is now opened up, and the spring-loaded lid 3 swings upward into its position B. The receiving space for the telephone receiver or the cell phone will now be freely accessible (FIG. 2).

After the release of the push button key 14, the push button key 14 and the lock bolt 15 return to their initial position.

When the rearward push button key 14 that is the rearward switching surface 21', is operated downward, the adjusting arm 25 of the push button key 14 is swivelled clockwise about a small angle, whereby the lock bolt 15 is moved forward in the receiving device 29, and the free end of the lock bolt 15 moves out of the recess 16 of the depositing bowl 6, so that the second lock 12 is unlocked (position F of the push button key 14).

When the second lock 12 is unlocked, the depositing bowl 6 together with the lid 3 is swivelled upward by means of the spring-loaded lid 3 into position G, in which the depositing compartment 1 is freely accessible. After the release of the push button key 14, the latter returns into its horizontal original position.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Depositing compartment assembly in a vehicle, comprising:
   a swivellably linked lid covering a depositing opening,
   a depositing bowl arranged in a depositing compartment which is accessible by swivelling open the lid, and
   one releasable lock respectively being arranged at least between the depositing bowl and the lid as well as between the depositing compartment and the depositing bowl, said locks being optionally unlockable by way of a joint unlocking device,
   wherein the unlocking device for the two releasable locks comprises a spring-loaded double-side push button key which interacts with an axially slidable lock bolt by way of an upright adjusting arm, and
   wherein depending on pressure exercised on the push button key, one lock or the other lock is unlocked.

2. Depositing compartment assembly according to claim 1, wherein the lock between the depositing bowl and the lid is a first lock, said first lock comprising a spring-loaded detent pawl which is arranged on the lid and, in the closed position of the lid, reaches behind a stationary detent of the depositing bowl, the swivellable detent pawl being displaceable by the axially slidable lock bolt into a release position.

3. Depositing compartment assembly according to claim 1, wherein the lock between the depositing compartment and the depositing bowl is a second lock, said second lock being formed by the lock bolt which, in the closed position of the lid, interacts with a recess of the depositing bowl.

4. Depositing compartment assembly according to claim 1, wherein the double-sided push-button key and the lock bolt are assigned to a housing which is inserted into a receiving opening.

5. Depositing compartment assembly according to claim 1, wherein a downward-projecting adjusting arm of the double-sided push button key projects with a free end into an upwardly open recess of the lock bolt, such that, depending on exercising of pressure onto the push button key, the lock bolt is moved into one or the other direction.

6. Depositing compartment assembly according to claim 2, wherein a downward-projecting adjusting arm of the double-sided push button key projects with a free end into an upwardly open recess of the lock bolt, such that, depending on exercising of pressure onto the push button key, the lock bolt is moved into one or the other direction.

7. Depositing compartment assembly according to claim 4, wherein a downward-projecting adjusting arm of the double-sided push button key projects with a free end into an upwardly open recess of the lock bolt, such that, depending on exercising of pressure onto the push button key, the lock bolt is moved into one or the other direction.

8. Depositing compartment assembly according to claim 6, wherein, when a forward switching surface of the push button key is operated, the lock bolt is slid to the rear, an end-side slope of the lock bolt swivelling the spring-loaded detent pawl of the lid counterclockwise and thus unlocking the first lock between the lid and the depositing bowl.

9. Depositing compartment assembly according to claim 8, wherein, the lock between the depositing compartment and the depositing bowl is a second lock, said second lock being formed by the lock bolt which, in the closed position of the lid, interacts with a recess of the depositing bowl, and when a rearward switching surface of the push button key is operated, the lock bolt is slid toward the front, a free end of the lock bolt moving out of the recess of the depositing bowl, so that the second lock is unlocked and the depositing bowl together with the lid can be swivelled upward into a release position.

10. Depositing compartment assembly according to claim 7, wherein, when a forward switching surface of the push button key is operated, the lock bolt is slid to the rear, an end-side slope of the lock bolt swivelling a spring-loaded detent pawl of the lid counterclockwise and thus unlocking the lock between the lid and the depositing bowl.

11. Depositing compartment assembly according to claim 10, wherein, when a rearward switching surface of the push button key is operated, the lock bolt is slid toward the front, a free end of the lock bolt moving out of the recess of the depositing bowl, so that the lock between the depositing compartment and the depositing bowl is unlocked and the depositing bowl together with the lid can be swivelled upward into a release position.

12. Depositing compartment assembly according to claim 1, wherein an outer lid contour extends approximately flush with a surface of an outer contour of the push button key when the push button key is in an inoperative position.

13. Depositing compartment assembly according to claim 2, wherein an outer lid contour extends approximately flush with a surface of an outer contour of the push button key when the push button key is in an inoperative position.

14. Depositing compartment assembly according to claim 3, wherein an outer lid contour extends approximately flush with a surface of an outer contour of the push button key when the push button key is in an inoperative position.

15. Depositing compartment assembly according to claim 4, wherein an outer lid contour extends approximately flush with a surface of an outer contour of the push button key when the push button key is in an inoperative position.

16. Depositing compartment assembly according to claim 5, wherein an outer lid contour extends approximately flush with a surface of an outer contour of the push button key when the push button key is in an inoperative position.

17. A locking assembly for a depositing compartment assembly disposed between passenger seats in a vehicle and including a depositing opening, a lid operable to selectively cover the depositing opening, and a depositing bowl disposed under the lid and movable with and separately of the lid, said locking assembly comprising:

a first lock between the lid and the depositing bowl, a second lock between the depositing bowl and the depositing compartment, and an unlocking device for the locks comprising a spring-loaded double-side push button key which interacts with an axially slidable lock bolt by way of an upright adjusting arm, and wherein depending on pressure exercised on the push button key, one lock or the other lock is unlocked.

18. A locking assembly according to claim 17, wherein said first lock comprises a spring-loaded detent pawl which is arranged on the lid and, in the closed position of the lid, reaches behind a stationary detent of the depositing bowl, the swivellable detent pawl being displaceable by the axially slidable lock bolt into a release position.

19. A locking assembly according to claim 17, wherein the second lock is formed by the lock bolt which, in the closed position of the lid interacts with a recess of the depositing bowl.

20. A locking assembly according to claim 18, wherein the second lock is formed by the lock bolt which, in the closed position of the lid interacts with a recess of the depositing bowl.

21. A locking assembly according to claim 18, wherein a downward-projecting adjusting arm of the double-sided push button key projects with a free end into an upwardly open recess of the lock bolt, such that, depending on exercising of pressure onto the push button key, the lock bolt is moved into one or the other direction.

22. A locking assembly according to claim 21, wherein, when a forward switching surface of the push button key is operated, the lock bolt is slid to the rear, an end-side slope of the lock bolt swivelling the spring-loaded detent pawl of the lid counterclockwise and thus unlocking the first lock between the lid and the depositing bowl.

23. A locking assembly according to claim 22, wherein, when a rearward switching surface of the push button key is operated, the lock bolt is slid toward the front, a free end of the lock bolt moving out of a recess of the depositing bowl, so that the second lock is unlocked and the depositing bowl together with the lid can be swivelled upward into a release position.

* * * * *